Aug. 8, 1967  C. F. DANIELS ET AL  3,334,895
APPARATUS FOR STACKING SHEETS OF VENEER
Filed April 30, 1965  3 Sheets-Sheet 3

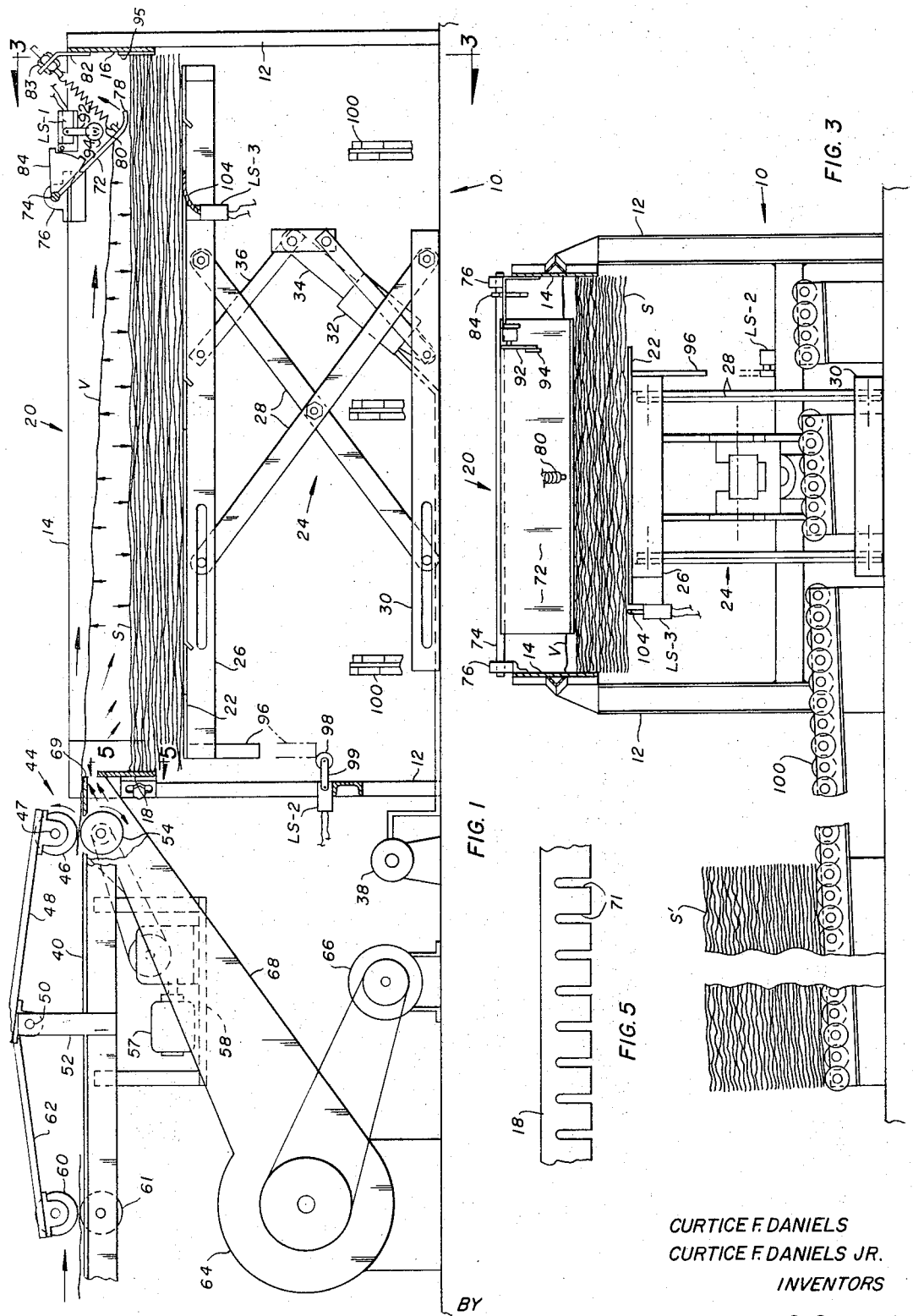
Aug. 8, 1967   C. F. DANIELS ET AL   3,334,895
APPARATUS FOR STACKING SHEETS OF VENEER
Filed April 30, 1965   3 Sheets-Sheet 1
CURTICE F. DANIELS
CURTICE F. DANIELS JR.
INVENTORS
BY BUCKHORN, BLORE, KLARQUIST & SPARKMAN
ATTORNEYS

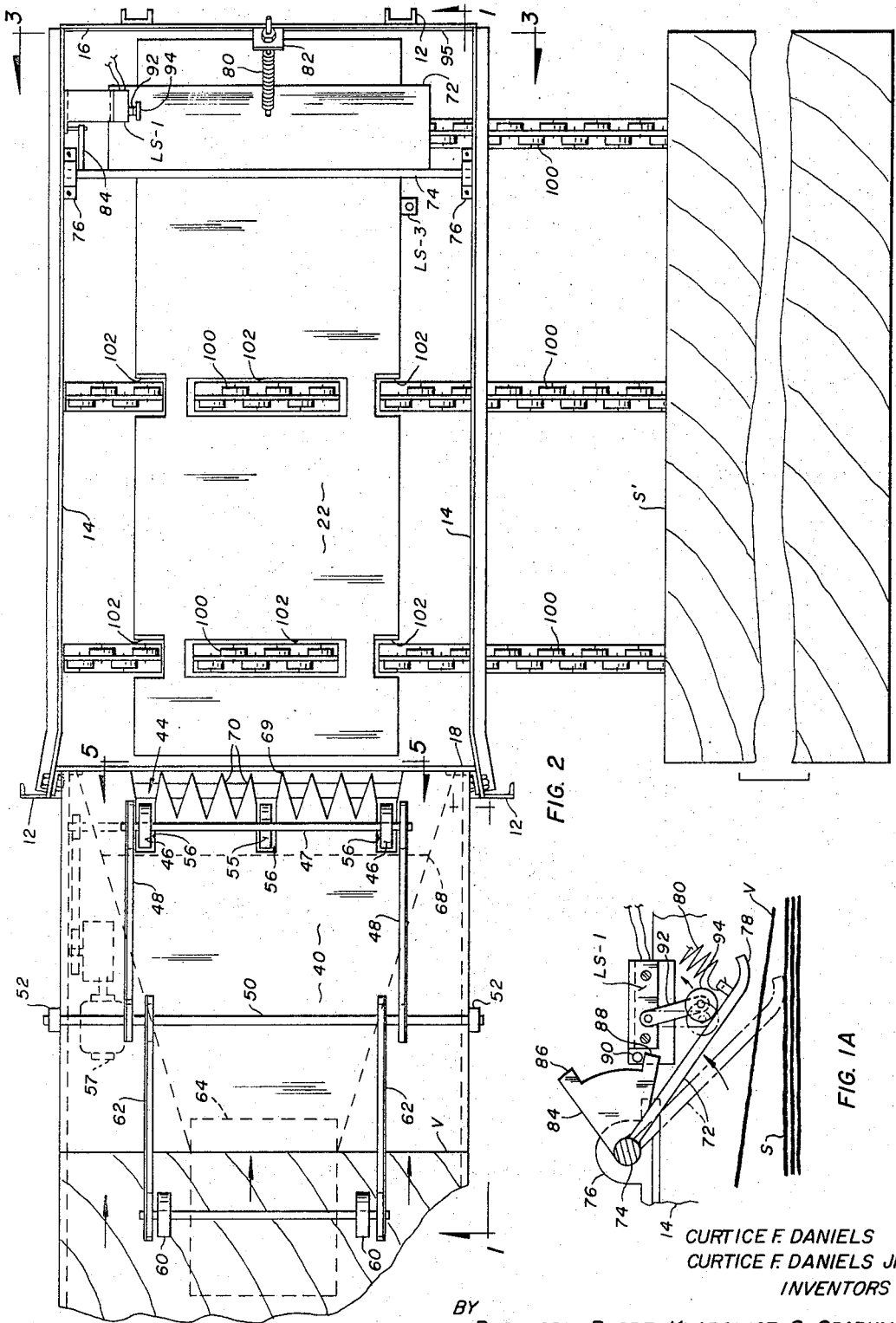

CURTICE F. DANIELS
CURTICE F. DANIELS JR.
INVENTORS
BY
BUCKHORN, BLORE, KLARQUIST & SPARKMAN
ATTORNEYS

United States Patent Office 3,334,895
Patented Aug. 8, 1967

3,334,895
APPARATUS FOR STACKING SHEETS
OF VENEER
Curtice F. Daniels, 205 Pacific Ave., and Curtice F.
Daniels, Jr., 2nd and Montgomery Sts., both of Glendale, Oreg. 97442
Filed Apr. 30, 1965, Ser. No. 452,087
16 Claims. (Cl. 271—68)

The present invention relates generally to the manufacture of veneer for use in making plywood, and more particularly to apparatus for stacking sheets of veneer.

Hitherto veneer sheets have been stacked mostly by hand, by pulling individual sheets of veneer manually from a conveyor belt and placing them in a hand truck or rack for subsequent transportation to another phase of the veneer or plywood-making operation.

At present, veneer strips or sheets are sorted and stacked by hand according to width and quality at several stations during its manufacture. For example, immediately after green veneer has been peeled from a log and clipped into strips of various widths, it is pulled by hand from the conveyor line and stacked according to width and grade for delivery to the dryer. After individual strips of veneer pass through the dryer, they are conveyed to a large round, revolving table where numerous men again sort the dried veneer strips according to grade and width, pull the strips from the table, and stack them for delivery to edge-gluing machines. Then, after two or more adjoining strips of veneer have been edge-glued to obtain the desired width, the resulting sheets are stacked for delivery to another station where they are laid up into plywood sandwiches prior to being placed in a press and formed into plywood.

Stacking veneer at the foregoing stations by hand is inefficient, expensive and laborious. Where one man both sorts and stacks, stacking requires a maximum amount of time and leaves little time for the exercise of judgment in sorting the veneer. As a result, veneers are often sorted inaccurately.

Although automatic apparatus for stacking veneers has been suggested before, such prior apparatus has merely consisted of a set of pinch rolls which feeds individual sheets horizontally at a high rate of speed against a backboard. The backboard stops the forward progress of the sheets and causes them to drop onto a pile below, often with considerable damage to the flimsy sheets from impact with the backboard. The damaged sheets must then be discarded. Manual labor is then required to straighten the undamaged sheets in the resulting stack. The sheets are also frequently damaged during their horizontal travel due to their leading edges dragging over the top of the stack and catching in knotholes or other defects in the top sheet of the stack.

Accordingly, a primary object of the present invention is to provide a new and improved veneer stacker which overcomes the above problems.

More specifically, an object is to provide a new and improved veneer stacker that stacks sheets of veneer automatically in neat, vertical piles, without the use of manual labor.

Another object is to provide a new and improved veneer stacker capable of feeding and stacking veneers at a high rate of speed and in rapid succession without damaging the veneers.

Another object is to provide a new and improved veneer stacker that can be utilized at the offbear end of any conveyor system.

Still another object is to provide a veneer stacker which unloads itself automatically when the stack reaches a predetermined height.

A specific object is to provide a veneer stacker which slows down the entering veneer sheets before they strike the back wall of the stacking bin.

Another specific object is to provide a veneer stacker which prevents the entering sheets from dragging over the top of the previously stacked sheets as the former are fed into the stacker.

Still another specific object is to provide a veneer stacker with means for speeding up the deposit of entering sheets onto the stack after they have been fed horizontally into the stacking bin.

Another object is to provide a stacker that is adapted for use in multiples in conjunction with sorting operations whereby a sorter can direct sheets of one size or quality into one stacker and sheets of another size or quality into another stacker, so that the sorter's time is spent primarily in sorting rather than in stacking.

In furtherance of the foregoing objects and advantages, an illustrated embodiment of the invention includes an open rectangular bin having a backboard, opposite sideboards and a front end through which sheets are fed horizontally toward the backboard by a set of pinch rolls. The table portion of a scissors lift forms the vertically movable bottom wall of the bin onto which the entering sheets are stacked.

As sheets are fed into the bin they are maintained above the top of the stack by a stream of air blown up under the entering sheets at the front end of the bin. Just prior to reaching the backboard, each entering sheet strikes a deflector plate in the bin which deflects the leading end of the sheet downwardly onto the stack and at the same time decelerates and straightens the sheet before it strikes the backboard to prevent damage to the sheet. Upon impact with a sheet, the deflector plate swings rearwardly and strikes a limit switch to lower the platform a short distance, whereby the top of the stack is maintained at a nearly constant level at all times during the stacking operation. When the stack reaches a predetermined height, the intermittently lowering platform strikes another limit switch which stops the pinch rolls and lowers the platform continuously to a lower limit position. In such position the stack becomes supported on rollers which extend through openings in the platform. The rollers are arranged in inclined rows so as to convey the stack, by gravity, from the platform and through an open side of the bin. As the stack rolls off the platform, a third limit switch is activated which causes the platform to rise to its starting position, whereupon the pinch rolls are restarted to feed additional sheets into the bin.

The foregoing and other objects and advantages will be more apparent in the following detailed description which proceeds with reference to the accompanying drawings wherein:

FIG. 1 is a somewhat schematic side elevational view, partly in section and taken along the line 1—1 of FIG. 2, showing a veneer stacker in accordance with the invention set up at the offbear end of a conveyor table;

FIG. 1A is an enlarged view of the deflector means of FIG. 1 in its deflected position just after impact with an entering sheet of veneer;

FIG. 2 is a top plan view of the stacker of FIG. 1 but with the stack of veneer removed from the stacker for clarity;

FIG. 3 is a vertical sectional view taken along the line 3—3 of FIGS. 1 and 2 near the rear end of the stacker;

FIG. 5 is a fragmentary sectional view taken along the line 5—5 of FIGS. 1 and 2 showing the front wall of the stacking bin;

*Description*

Figure 6:
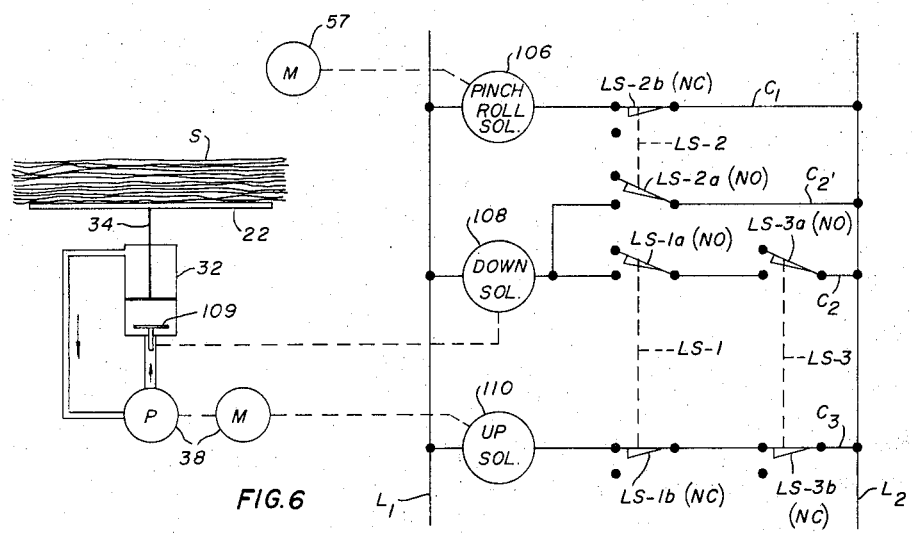
FIG. 6 is a diagram of an electrical circuit for operating the stacker.

With reference to the drawings, and particularly FIGS. 1 through 3, the veneer stacker is composed of an open rectangular frame structure 10 including four upright channel members 12 at the corners of the structure which support at their upper ends a pair of opposite sideboards 14, a blackboard 16 and a front wall 18. The walls together define a rectangular bin 20 having an open top and being of just a large enough area to receive sheets of veneer V of a predetermined size. A stacking table, or platform, 22 defines the bottom wall of the bin and is mounted on a vertically movable scissors hoist 24, including horizontal platform-supporting members 26 and leg members 28 pivotally mounted on base members 30. The platform 22 is movable vertically by a fluid-actuated hoist cylinder 32 having a piston rod 34. The cylinder is pivotally mounted to base member 30, and piston rod 34 is pivotally mounted to a lever member 36 so that upon extension of the rod the table is raised and upon retraction of the rod, the table is lowered.

An electric motor-driven pump 38 supplies fluid under pressure to drive the hoist cylinder 32.

The stacking bin is set up at the offbear end of a conveyor table 40 which may lead from, for example, an edge-gluing machine or veneer dryer (not shown) The table 40 extends a short distance into the bin at a level considerably above the platform 22 and the top of a stack S of veneers on the platform. However, the table 40 is at a level below the top of the backboard 16 so that sheets of veneer V conveyed horizontally from the conveyor table toward the backboard will be stopped thereby.

A set of pinch rolls 44 is mounted near the offbear end of the conveyor table 40 for conveying sheets of veneer V, one or more at a time, horizontally through the front end of the bin in a direction toward the backboard 16. The pinch rolls include a pair of upper idler rolls 46 carried by a shaft 47 at the outer ends of a pair of vertically pivotable arms 48 which in turn are rotatably mounted on a lateral shaft 50 supported above the table 40 by a pair of upright supports 52 mounted at opposite sides of the table. The pinch rolls also include a pair of lower, driven rolls 54 against which the upper rolls are resiliently urged, and a third driven roll 55 (FIG. 2) between the two rolls 54. The driven rolls are mounted on a shaft just below the table 40 so that the upper peripheries of such rolls extend through slots 56 in the conveyor table to a level just slightly above the top of the table. The driven rolls are driven by an electric motor 57 through a pulley and belt arrangement, the motor being suspended on a platform 58 beneath the conveyor table.

A set of upper idler guide rolls 60 are mounted above the conveyor table upstream from the pinch rolls on the ends of a second pair of support arms 62 pivotably mounted on the same shaft 50 as the support arm 48, but extending in an opposite direction therefrom. A set of lower guide rolls 61 are paired each with one of the upper guide rolls 60 and are keyed to a horizontal idler shaft positioned beneath the conveyor table so that such rolls extend slightly above the top surface of the table through appropriate slots therein. The lower guide rolls serve to eliminate table-top drag while the lower and upper rolls together prevent sheets fed therebetween from shifting laterally or twisting on the table before reaching the pinch rolls.

Mounted beneath the conveyor table is a large capacity air blower 64 driven by an electric motor 66. The blower directs a stream of air through an upwardly inclined duct 68 which terminates at its upper end against the underside of the conveyor table rearwardly of the pinch rolls and at the upper edge of front wall 18. The offbear end edge 69 of the conveyor table just downstream from the pinch rolls is provided with a series of V-shaped slotted openings 70 spaced nearly the full width of the conveyor table to provide the end edge with a sawtooth configuration. The opening at the upper terminal end of the duct 68 also extends substantially the full width of the table so that the stream of air generated by the blower is forced upwardly through the slots 70 and thus beneath each sheet V as it is fed into the bin. The front end wall 18 is preferably vertically adjustable (see FIG. 1) to regulate the size of the opening needed at the upper end of duct 68 to obtain the desired turbulence and lift for a given specie and thickness of veneer.

The effect of the foregoing is to provide a high-pressure cushion of air between the entering sheet V and the top of the stack S which maintains each entering sheet out of any substantial engagement with the stack during most of its horizontal travel in order to prevent damage to both the entering sheet V and the top sheet S of the stack. Just before the leading end of the entering sheet V strikes the backboard, the trailing end thereof passes over the slots 70 so that air is no longer directed beneath the sheet. To hasten settling once the infed sheet reaches its stacking position, the front wall 18 is provided with a series of upright slots 71, shown clearly in FIG. 5, which permit air trapped under the infed veneer to escape from the bin.

The bin is also provided with deflecting and decelerating means for slowing down sheets V fed into the bin by the pinch rolls before they strike the backboard 16 to prevent damage to the fragile leading ends of the sheet. Such means also serves to deflect the entering sheets V down onto the top of the stack as they near the end of their horizontal travel. As shown best in FIGS. 1 and 1A, such means include a deflector plate 72 fixed to a lateral shaft 74 rotatably mounted in bearings 76 on the upper edges of the opposite sideboards 14. The deflector plate is inclined downwardly and rearwardly from the shaft 74 and has a rearwardly curved lower end 78 which normally terminates next adjacent the top of the stack S, or next adjacent the platform 22 if the platform is empty.

The deflector plate is resiliently held in its normal position by a coil spring 80 which is adjustably attached at its upper end to a bracket 82 on the backboard 16 by a nut and bolt assembly 83. The pivot shaft 74 also carries a limit plate 84 which rotates with the shaft and has upper and lower ears 86 and 88 which engage a stop pin 90 on a bracket for limit switch LS–1, to define the upper and lower limits of swinging movement of the deflector plate 72.

The limit switch LS–1 is mounted near the upper edge of one of the sideboards 14 rearwardly adjacent one end of the deflector plate 72 and has a downwardly extending pivotable actuating arm 92 which carries a roller 94 at its lower end just above and to the rear of the deflector plate. Thus, when the leading end of an entering sheet V strikes the front face of the deflector plate, the plate swings up against the roller 94 to actuate the arm 92 and thereby activate the switch LS–1 momentarily before swinging back to its normal, lower position. Activation of the limit switch closes an electrical circuit momentarily to open a relief valve on the hoist cylinder which acts to lower the platform 22 a short distance. Thus the platform is lowered slightly, by steps, each time a new sheet V is fed into the bin so that the top of the stack S is maintained at an approximately constant level during the stacking operation.

At the same time that the deflector plate swings upwardly from impact with an entering sheet, the leading end of such sheet is deflected downwardly toward the top of the stack S as it slides beneath the lower end 78 of the deflector plate. The impact arrests the forward speed of the sheet V somewhat and also tends to straighten, or square, the sheet before it strikes the backboard 16, thereby preventing damage thereto and causing it to fall vertically onto the stack S upon striking the backboard. When exceptionally high infeed speeds are used, additional protection for the leading ends of the veneers is desirable and provided, as shown in FIG. 1, by a rubber or other resilient padding layer 95 attached to the inside face of backboard 16 in the area of veneer impact.

Figure 4:
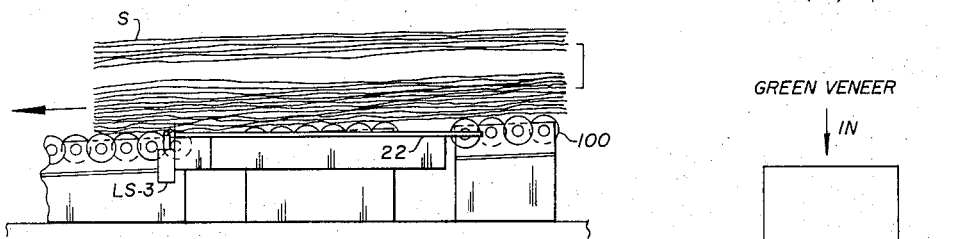
FIG. 4 is a fragmentary sectional view similar to FIG. 3 but showing the stacking platform in its lowermost position for unloading a stack from the stacking bin.
Figure 7:
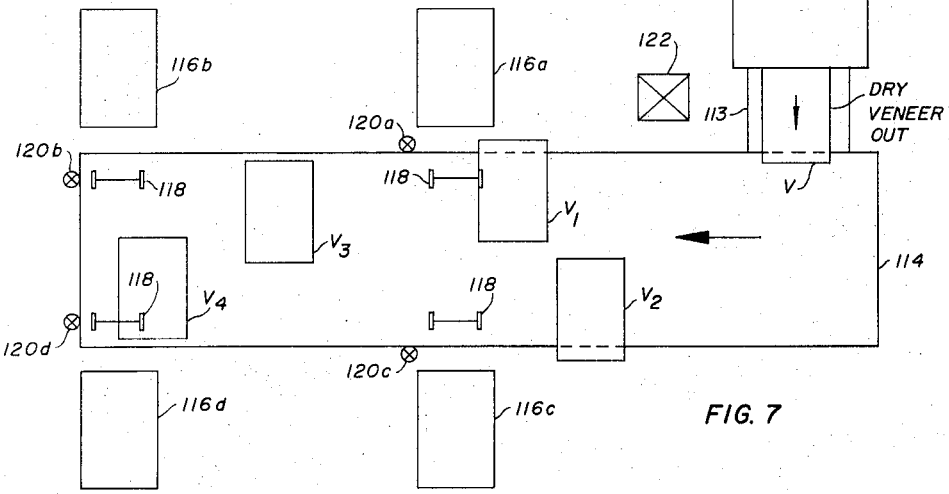
FIG. 7 is a schematic layout of a battery of stackers arranged on the opposite sides of an offbear conveyor from a veneer dryer illustrating the use of multiple conveyors in conjunction with a sorting operation.

The forward end of the platform 22 carries a downwardly projecting arm 96 which impinges against a roller 98 at the end of an actuating arm 99 of a second limit switch LS–2 when the stack S reaches a predetermined height. Activation of switch LS–2 completes an electrical circuit to open the previously mentioned relief valve on the hoist cylinder 32 to lower the platform continuously to a lower limit position as shown in FIG. 4. Activation of limit switch LS–2 also shuts off the motor 57 which drives the pinch rolls to prevent the infeed of sheets into the bin until the platform again rises to a level sufficient to release the actuating arm 99.

Referring especially to FIGS. 3 and 4, a series of rollers 100 are arranged in three double rows which extend laterally at an inclination downhill from within the lower end of the framework 10, through an open side thereof to a terminus at a considerable distance to one side of the framework. As clearly shown in FIG. 2, the stacking platform 22 is provided with a series of laterally and longitudinally spaced openings 102 which are in vertical alignment with those of the rollers 100 which lie within the framework 10. Thus when the platform reaches its lower limit position, as shown in FIG. 4, the rollers within the framework extend through the openings 102 in the platform and slightly above the top surface thereof to support the stack S. The inclination of the rows of rollers within the framework is such that the stack will roll by the force of gravity laterally from the platform and out through the frame 10 to a position alongside the stacker as shown with respect to stack S' in FIG. 3, where the stack S' can be conveniently picked up by a conventional fork lift truck and transported to the next processing station.

Mounted on a horizontal frame member 26 which supports the stacking platform 22 is a third limit switch LS–3 having a spring arm 104 that is normally depressed, as shown in FIG. 1, by an undersurface portion of stack S that overhangs a side edge of the stacking platform 22. So long as the spring arm 104 is depressed, the platform 22 can be lowered by activation of either limit switch LS–1 or limit switch LS–2. However, when the stack S rolls off the platform in the lower limit position of the latter so that spring arm 104 is no longer depresesd, a circuit is completed to close a solenoid switch on the motor that drives pump 38 and thus raise the platform 22 to its starting position. Simultaneously, with spring arm 104 released, switch LS–3 also opens the circuit which controls the relief valve on hoist cylinder 32 so that the platform cannot be lowered.

*Operation*

The sequence of operation of the machine can best be explained with reference to the electrical and hydraulic circuit diagram of FIG. 6. Each of the limit switches LS–1, LS–2 and LS–3 has two pairs of contacts which are operated simultaneously by a single movable arm. There are three separate circuits $C_1$, $C_2$ and $C_3$, all connected to a common electrical source designated by lines $L_1$ and $L_2$. Circuit $C_1$ includes a solenoid 106 for controlling the operation of the motor 57 which drives the pinch rolls 44. Circuit $C_2$ has connected therein a solenoid 108 which operates the relief valve 109 on hoist cylinder 32. Circuit $C_2$ also includes a branch line $C_2'$ for a purpose to be explained below. The third circuit $C_3$ includes a solenoid 110 which controls the operation of the motor which drives the pump unit 38 for raising the platform 22.

Limit switch LS–1 includes a normally open contact LS–1$a$ in circuit $C_2$ and a normally closed contact LS–1$b$ in circuit $C_3$. Limit switch LS–2 includes a normally open contact LS–2$a$ in circuit $C_2$, and a second, normally closed contact LS–2$b$ in circuit $C_1$. Limit switch LS–3 includes a normally open contact LS–3$a$ in circuit $C_2$ and a normally closed contact LS–3$b$ in circuit $C_3$.

With the platform 22 in its stationary, up position and empty, but ready to receive sheets fed into the bin by the pinch rolls, contact LS–1$a$ in circuit $C_2$ is held closed and contact LS–1$b$ in circuit $C_3$ is held open by the deflector plate bearing against actuating arm 92 (FIG. 1A). Contact LS–3$a$ is open at this point in circuit $C_2$ to prevent platform 22 from lowering. As soon as a sheet is fed into the bin, however, it depresses spring arm 104 on switch LS–3 (FIG. 1) to close contact LS–3$a$, causing platform 22 to lower until deflector plate 72 releases the actuating arm of switch LS–1 to reopen contact LS–1$a$ and stop the platform. Contact LS–3$a$ will remain closed thereafter so long as there are sheets on the platform. Thus, lowering of the platform is controlled solely by contacts LS–2$a$ and LS–1$a$ while sheets are on the platform. Additional sheets fed into the bin and striking deflector plate 72 will momentarily close contact LS–1$a$ to activate the down solenoid 108 and open the relief valve 109 to lower platform 22 one step each time an additional sheet is fed into the bin.

Lowering of the platform by steps continues until lower arm 96 of platform 22 depresses actuating arm 99 of switch LS–2, whereupon contact LS–2$a$ is closed to lower the platform continuously, and simultaneously contact LS–2$b$ is opened to shut off the pinch rolls. When platform 22 reaches its lower limit position, stack S rolls off the platform 22 and out of the bin to reopen contact LS–3$a$ and reclose contact LS–3$b$. Since contact LS–1$b$ in circuit $C_3$ is also normally closed at this point, circuit $C_3$ through the up solenoid 110 is completed to start the motor and pump 38 and thus raise the platform 22. When the platform 22 rises high enough to release limit switch LS–2 and thereby reclose contact LS–2$b$, the pinch roll solenoid 106 is prevented from activating motor 57 to drive the pinch rolls by a time delay until the platform reaches its upper limit positon.

As the platform 22 continues to rise, it engages deflector plate 72 and swings it upwardly against the roller 94 on the actuating arm 92 to close contact LS–1$a$ and simultaneously open contact LS–1$b$ to stop the pump 38 and thus stop the rise of the platform 22. The closing of contact LS–1$a$, however, does not cause the platform to lower since contact LS–3$a$ remains open from the fact that there are as yet no sheets on the platform. However, as soon as a sheet is fed onto the platform by the pinch rolls, contact LS–3$a$ will again close to lower the platform until contact LS–1$a$ reopens through release of the actuating arm of switch LS–1 by the deflector plate. This completes one cycle of the stacking and unloading operation. Thereafter additional sheets fed into the bin by the pinch rolls will close intermittently contact LS–1$a$ to lower the platform in steps as before.

From the foregoing it will be apparent that the apparatus is completely automatic in feeding, stacking and unloading veneers. It also has utility when used in multiples on opposite sides of a conveyor line in conjunction with a sorting operation as disclosed, for example, in FIG. 6.

FIG. 6 is a diagrammatic layout of a dryer line including a conventional dryer unit 112 from which dried strips of veneer V are conveyed on an offbear conveyor 113. Conveyor 113 feeds the strips onto a lateral conveyor 114 on the opposite sides of which are placed a battery of four stackers 116$a$, 116$b$, 116$c$ and 116$d$ as described previously. Each stacker includes a set of pinch rolls 118 mounted near a side edge of conveyor 114. Each stacker also includes an associated limit switch 120a–d, with the limit switches 120a and 120c for the upstream stackers 116a and 116c being mounted at the opposite side edges of the conveyor 114. The limit switches 120b and 120d for the two downstream stackers 116b and 116d are positioned at the downstream end of conveyor 114 inwardly of the side edges thereof.

The lower and upper pinch rolls of each set are normally spaced from each other so that a veneer can pass between such pinch rolls as illustrated with respect to veneer $V_4$. However, when the downstream edge of sheet $V_4$ strikes limit switch 120d, the pinch rolls clamp against veneer $V_4$ to feed it into stacker 116d. The other stackers operate in a similar manner. A sorter stands at station 122 and positions each strip on the conveyor 114 as it passes by in accordance with whichever stacker he wants a strip to enter. For example, the sorter slides strip $V_1$ slightly over the inside edge of the conveyor 114 to strike limit switch 120a and thus enter stacker 116a. Similarly, he slides strip $V_2$ slightly over the outside edge to strike switch 120c and enter stacker 116c. To feed sheets $V_3$ and $V_4$ into the end stackers 116b and 116d, respectively, he slides the strips to intermediate positions on the conveyor 114, between the side edges, for striking switches 120b and 120d respectively.

No doubt applications other than those mentioned above will occur to persons familiar with the manufacture of veneer.

Having illustrated and described a preferred embodiment of the invention, it should be apparent to those skilled in the art that the invention permits of modification in arrangement and detail. We claim as our invention all such modifications as come within the true spirit and scope of the appended claims.

We claim:
1. A veneer stacker comprising:
   upright wall means defining an open rectangular bin for receiving veneers to be stacked, said bin including a front end, a back end wall and opposite sidewalls,
   a vertically movable stacking platform defining a bottom wall of said bin,
   said platform including a series of openings therethrough,
   means for raising and lowering said platform, including control means for lowering said platform and control means for raising said platform,
   conveyor means adjacent said front end for feeding veneer sheets horizontally through said front end in a direction toward said back wall at a level above said platform and a stack of veneers supported thereon,
   deflector means within said bin for decelerating each infed sheet before it strikes said back wall and for simultaneously deflecting the leading end of said infed sheet downwardly toward said platform,
   said control means for lowering said platform being activated momentarily to lower said platform a short distance each time said deflector means is struck by an infed sheet such that the top of the stack remains at a substantially constant level within said bin during a stacking operation,
   and blower means for directing a stream of air against the underside of each infed sheet at the forward end of said bin such that a pressurized cushion of air is created between said entering sheet and the top of said stack,
   said cushion maintaining the leading end edge of each infed sheet out of any substantial engagement with the top of the stack during its travel from said front end to said deflector means to prevent damage thereto,
   and unloading means for automatically unloading said stack when said platform reaches a lower limit position,
   said unloading means including roller means extending in rows from within said bin to a position outside said bin,
   said roller means within said bin extending through said platform openings and above said platform in the lower limit position of the latter such that said stack becomes supported on said roller means,
   said rows of roller means extending at a downward inclination from within said bin such that said stack is conveyed from said bin on said roller means by gravity.

2. A veneer stacker according to claim 1 wherein:
   said control means for lowering said platform is continuously operable by said platform when the stack thereon reaches a predetermined height for lowering said platform to said lower limit position,
   and said control means for raising said platform is operable upon the removal of a stack from said platform to raise said platform to an upper limit position for receiving additional sheets.

3. A veneer stacker according to claim 2 wherein the upper limit position of said platform is determined by mutual engagement of said platform, said deflector means and said control means for lowering said platform, while said platform is empty.

4. A veneer stacker according to claim 2 wherein the upper limit position of said platform is determined by the activation of said control means for lowering said platform by said deflector means and the simultaneous activation of said control means for raising said platform by reason of said platform being empty.

5. A veneer stacker comprising:
   a frame structure defining a rectangular bin having opposite sidewalls, a back end wall, a front end wall and an open top,
   a vertically movable platform means forming the bottom wall of said bin,
   a conveyor table adjacent said front end wall including means defining a front end opening between said table and said front end wall;
   a set of pinch rolls adjacent the offbear end of said conveyor table for feeding one or more sheets at a time horizontally into said bin over said front wall and toward said back wall,
   a blower means including means directing a stream of air upwardly through said front end opening such that an infed sheet covering said opening deflects said stream into said bin between said infed sheet and said stack to create a pressurized cushion of air which maintains said infed sheet above the top of said stack until said infed sheet passes over said front end opening,
   deflector means including a deflector plate extending laterally between the opposite sidewalls of said bin adjacent said back end wall and downwardly from a lateral pivotal axis at a level above said platform means to a lower end edge,
   resilient means normally supporting said deflector plate in a downwardly and rearwardly inclined position with respect to said pivotal axis with said lower end edge just above the top of said stack such that an infed sheet striking said plate is deflected downwardly toward said stack,
   said resilient means enhancing the upward and rearward swinging movement of said deflector plate upon the impact of an infed sheet with said plate so as to enable said infed sheet to slide under said plate after striking the same,
   platform operating means for raising and lowering said platform,
   a first limit switch adjacent said deflector plate and operable momentarily thereby during its upward swinging movement to energize said platform-operating means so as to lower said platform means a short distance, a second limit switch operable by said platform upon the lowering of said platform means to a predetermined level to energize said platform-operating means and thereby continuously lower said platform to a lower limit position, roller means arranged in rows extending laterally from within said bin through an opening in one side thereof, said platform means having openings therethrough in vertical alignment with a portion of said roller means such that upon the lowering of said platform means to said lower limit position said portion extends through said platform openings and above the top of said platform means to support said stack, said roller means extending at an inclination downwardly from within said bin at an angle such that said stack is conveyed by gravity on said roller means to a position alongside said bin, a third limit switch carried by said platform means and normally engageable by a stack thereon, said third limit switch being operable upon the removal of a stack from said platform means to energize said platform-opearting means and raise said platform means to an upper limit position for receiving additional sheets.

6. In a veneer stacker including an open rectangular bin having a vertically movable stacking platform and means for feeding sheets of veneer one above the other onto said platform, an automatic unloading means comprising:
a series of rollers arranged in two or more rows, beneath the level of said platform during the stacking operation, said rows extending from within said bin to a terminal end outside of said bin, means defining openings through said platform, said rollers normally beneath said platform being aligned with the openings in said platform, means for lowering said platform to a lower limit position when the stack thereon reaches a predetermined height, the tops of said rollers normally beneath said platform extending through said openings and above the upper level of said platform so as to support the stack thereon when said platform is in said lower limit position, said rows inclined downwardly in a direction outwardly of said bin at an inclination such that said stack is rolled by the force of gravity on said rollers to a position outside of said bin.

7. A veneer sorting system comprising:
a conveyor table for conveying a series of veneer sheets to be sorted, a plurality of bin structures arranged along at least one side of said conveyor table, each of said bin structures including an open front end next adjacent a side edge of said conveyor table, a back end wall, and opposite sidewalls, feeder means adjacent the front end of each said bin structure for feeding a veneer sheet laterally from said conveyor table through the front end of each said bin, said feeder means normally being inactive so as to permit the unobstructed conveyance of sheets on said conveyor table from one end thereof to the other, a sheet sensing means on said conveyor table adjacent each said bin structure for detecting when a sheet is in alignment with the open front end of the associated said bin structure, said sheet sensing means for each bin structure occupying a different relative position on said conveyor table than said sensing means for every other said bin structure such that the operation of any one of said sensing means is dependent upon the proper alignment of a sheet on said conveyor table with respect to the same said sensing means, each said sensing means being operable to energize the associated said feeder means upon alignment of a sheet with the open front end of the associated said bin structure and simultaneously with said sensing means such that the aligned sheet is fed into said associated bin.

8. A sorting system according to claim 7 wherein each said bin structure includes a vertically movable stacking platform, means operable to lower said platform upon the infeed of each new sheet to said bin, decelerating means for decelerating each infed sheet before it strikes said back end wall, blower means for creating a pressurized cushion of air between each infed sheet and the top of a stack on said platform, and means for automatically unloading a stack from said bin upon the lowering of said platform to a lower limit position.

9. In a veneer stacker including a rectangular bin having a back end wall, opposite sidewalls, an open front end portion, a vertically movable bottom wall, feeder means for feeding sheets of veneer through said open front end toward said back end wall, rearwardly pivotable deflector means for decelerating each infed veneer before it strikes said back end wall, roller means for unloading a stack of veneers from said platform, and a control means for automatically controlling the operation of said stacker, said control means comprising:
first means operable through momentary engagement with said deflector means during the rearward swinging movement of the last-mentioned means to lower said platform a short distance each time a sheet strikes said deflector means, second means operable through engagement with said platform when the latter is lowered to a predetermined level to shut off said feeder means and simultaneously lower said platform to a lower limit position such that a stack on said platform is conveyed therefrom by said roller means, third means operable upon conveyance of a stack from said platform to raise said platform, said second and third means together being operable upon engagement of said platform, when empty, with said deflector means to maintain said platform in an upper limit position in engagement with said deflector means until additional sheets are fed into said bin.

10. A method of stacking sheets of wood veneer in a vertical stack comprising:

feeding sheets of veneer one sheet at a time horizontally toward a fixed upright end wall at a level above the top of said stack, during the horizontal travel of each sheet, blowing a stream of air upwardly against the underside thereof to help support the same above said stack.

and decelerating each said sheet during its travel and simultaneously deflecting the leading end thereof downwardly onto said stack just before said leading end strikes said end wall so that the impact of each sheet with said end wall does not damage the infed sheet, and discontinuing the blowing of air against the underside of each sheet when the leading end thereof is adjacent said end wall so as to hasten the settling of said sheet onto said stack.

11. Apparatus for stacking sheets of wood veneer comprising in combination:

a vertically movable horizontal stacking platform having a front end and a rear end, an upright backboard in a fixed position at the rear end of said platform and extending above said rear end, a set of infeed pinch rolls forwardly adjacent the front end of said platform positioned for feeding sheets of veneer in a generally horizontal path toward said backboard and above said platform, an air blower having an upwardly directed outlet positioned forwardly adjacent the front end of said platform and terminating vertically below said path for supporting each infed sheet on a cushion of air, a sheet deflector and decelerator plate means extending across said platform and normal to said path throughout the greater portion of the width of said platform, said plate means being in horizontal alignment with said backboard between said blower outlet and said backboard and closer to said backboard for deflecting the leading end of each infed sheet toward said platform before said leading end reaches said backboard, plate mounting means mounting said plate in depending relation therefrom for swinging movement about a horizontal axis extending transversely above said platform, and platform lowering means including means operable in response to the infeed of each new sheet for lowering the platform in steps.

12. Apparatus according to claim 11 wherein said plate mounting means includes spring means normally maintaining said platform in a position extending at an inclination downwardly and rearwardly from said axis toward said backboard in a blocking position relative to the path of each infed sheet and urging said plate in a rearward direction under a predetermined force sufficient when combined with the impact force of an infed sheet to cause upward and rearward swinging movement of said plate means about said axis, whereby to permit each infed sheet to pass beneath said plate means in traveling toward said backboard.

13. Apparatus according to claim 11 including unloading means for removing a stack of veneer from said platform is lowered to a predetermined lower limit position.

14. Apparatus according to claim 13 including control means operable with the platform in its lower limit position to return the platform to an upper starting position following the unloading of each stack therefrom,
said control means also being operable to deactivate said pinch rolls during the unloading operation and to reactivate said pinch rolls upon the return of said platform to its starting position.

15. A veneer stacker comprising,
a frame structure defining a rectangular bin having opposite side walls, a back end wall, a front end wall, and an open top,
a vertically movable platform means forming the bottom wall of said bin,
a conveyor table having an offbear end forwardly adjacent said front end wall including means defining a front end opening between said table and said front end wall,
a set of infeed pinch rolls adjacent the offbear end of said conveyor table for feeding one or more sheets at a time horizontally into said bin over said front end wall and toward said back end wall,
a blower means including means directing a stream of air upwardly through said front end opening so that an infed sheet above said opening deflects said stream into said bin between said infed sheet and said stack to create a pressurized cushion of air which maintains said infed sheet above the top of said stack until the trailing end thereof passes by said front end opening,
and means defining air outlet openings in at least one upright wall of said bin in positions for permitting the escape of air trapped between said infed sheet and said stack to hasten the settling of said infed sheet onto said stack after the trailing end of each infed sheet passes by said front end opening and into said bin,
the offbear end of said conveyor table being transversely slotted to define said front end opening.

16. A veneer stacker comprising,
a frame structure defining a rectangular bin having opposite side walls, a back end wall, a front end wall and and open top,
a vertically movable platform means forming the bottom wall of said bin,
a conveyor table having an offbear end forwardly adjacent said front end wall including means defining a front end opening between said table and said front end wall,
a set of infeed pinch rolls adjacent the offbear end of said conveyor table for feeding one or more sheets at a time horizontally into said bin over said front end wall and toward said back end wall,
a blower means including means directing a stream of air upwardly through said front end opening such that an infed sheet above said opening deflects said stream into said bin between said infed sheet and said stack to create a pressurized cushion of air which maintains said infed sheet above the top of said stack until the trailing end thereof passes by said front end opening,
and means defining air outlet openings in at least one upright wall of said bin in positions for permitting the escape of air trapped between each infed sheet and said stack to hasten the settling of said stack after the trailing edge of each sheet passes by said front end opening,
said air outlet openings being provided in said front end wall downwardly of the topmost edge thereof.

References Cited
UNITED STATES PATENTS

| | | | |
|---|---|---|---|
| Re. 25,283 | 11/1962 | Yingling | 271—68 X |
| 2,938,724 | 5/1960 | Buccicone | 271—68 |
| 3,025,057 | 3/1962 | Dale et al. | 271—68 |
| 3,224,761 | 12/1965 | Meyer-Jagenberg | 271—68 |

EVON C. BLUNK, *Primary Examiner.*

SAMUEL F. COLEMAN, *Examiner.*

A. C. HODGSON, *Assistant Examiner.*

UNITED STATES PATENT OFFICE

CERTIFICATE OF CORRECTION

Patent No. 3,334,895　　　　　　　　　　　　　August 8, 1967

Curtice F. Daniels et al.

It is hereby certified that error appears in the above numbered patent requiring correction and that the said Letters Patent should read as corrected below.

Column 6, line 8, for "$C_2$," read -- $C_{2'}$ --; column 7, line 64, for "a" read -- the --; column 9, line 26, for "platform-opearting" read -- platform-operating --; column 11, line 39, after "platform" insert -- when said platform --; column 12, line 21, for "and and" read -- and as --; line 44, after "said", second occurrence, insert -- infed sheet onto said --.

Signed and sealed this 16th day of July 1968.

(SEAL)
Attest:

Edward M. Fletcher, Jr.　　　　　　　　　　　　EDWARD J. BRENNER
Attesting Officer　　　　　　　　　　　　　　　Commissioner of Patents